Nov. 28, 1950   R. J. BREIT   2,532,143
ACCUMULATOR
Filed April 6, 1946

INVENTOR.
ROBERT J. BREIT
BY
ATTORNEY

Patented Nov. 28, 1950

2,532,143

UNITED STATES PATENT OFFICE 2,532,143

ACCUMULATOR

Robert J. Breit, San Antonio, Tex., assignor to Jack & Heintz Precision Industries, Inc., Cleveland, Ohio, a corporation of Delaware Application April 6, 1946, Serial No. 660,261

4 Claims. (Cl. 138—30)

This invention relates to energy storage units known in the art as accumulators and more particularly to accumulators for use with high pressure hydraulic systems.

One of the primary objects of the invention is to provide an accumulator diaphragm that will be positively impervious to fluid and gas and consequent loss of accumulated pressures.

It is, therefore, proposed to provide a modified form of the diaphragm consisting of two separate elements one within the other and having a substance interposed between the two elements to act as a lubricant or high heat conductor.

It is further proposed to provide a diaphragm for an accumulator composed of two layers of material one of the layers being butyl rubber which is impervious to air, nitrogen, carbon dioxide and the like, and the other layer being Buna "N" rubber which is impervious to mineral base oils.

With the foregoing and other objects in view the invention resides in the combination of parts and the details of construction set forth in the following specifications and appended claims, certain embodiments thereof being shown in the accompanying drawings in which:

Figure 1:
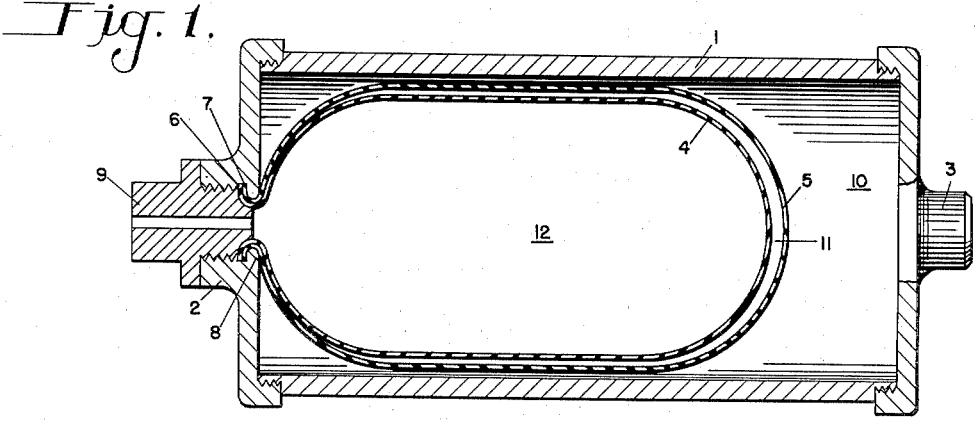
Figure 1 is a view in longitudinal section of an accumulator having two diaphragm elements.

Referring more particularly to the drawings in Figure 1 they show an accumulator 1 having bell ends 2 and 3 and containing two resilient elements 4 and 5 which act together as a diaphragm. The ends 6 and 7 of the elements 4 and 5 are bonded together and are further bonded to a ledge 8 of the accumulator. A bushing 9 is screwed into the bell end 2 to assist by engagement to maintain the ends 6 and 7 of resilient elements 4 and 5 in a securely bonded relationship with the ledge 8. The bell end 3, shown in elevation, contains a suitable charging valve, not shown, for the accumulator.

The space 10 between elements 5 and the wall of the accumulator 1 is occupied by a fluid such as air, nitrogen, carbon dioxide, helium, or the like, under high pressure. The space 11 between diaphragm elements 4 and 5 is preferably occupied by fluid which has high lubricating and heat conductive characteristics. This is to insure a longer life for the elements 4 and 5 and to insure a better heat transfer between them. The space 12 within element 4 is filled with a fluid, such as a mineral base oil, which is discharged to the system as indicated when the operating valve, not shown, secured to bushing 9 is opened.

The element 5 may preferably be made of butyl rubber which is impervious to fluid gases such as air, nitrogen, helium, carbon dioxide and the like. Element 4 may be made of Buna "N" rubber or variations such as conventional Goodyear Hycar which is impervious to mineral base oils. The purpose of adding a fluid of high heat conductivity and good lubricating qualities, such as glycerin, in the space 11 between elements 4 and 5 is to protect the two from wear due to frictional contact with each other under varying pressures in the accumulator as well as providing a good heat transfer medium.

Figure 2:
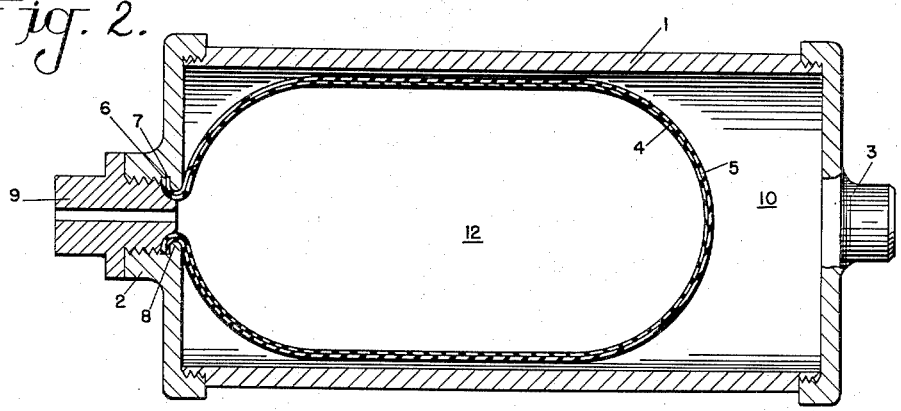
Figure 2 is a view similar to Figure 1 of a modified form of diaphragm comprised of one element having two layers.
Figure 3:
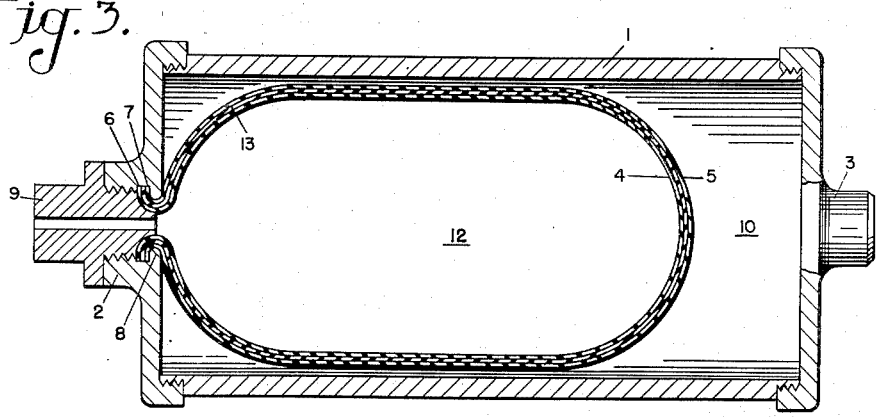
Figure 3 is a view similar to Figure 2 of a modified form of diaphragm in which a third layer is interposed between the other two layers of the diaphragm.

Figure 2 shows the elements 4 and 5 in a modified form bonded together as a single element. Figure 3 shows another modification of the invention similar in nature to Figure 2 but in which a third element 13 is interposed between elements 4 and 5 to act as a stiffener or bonding material, such as nylon, rayon, and the like.

The immediate advantages to be gained by using a two layer or two element diaphragm such as the invention proposes are three fold and will be discussed in brief in lieu of an explanation of the operation of the accumulator which is well known in the art. First the diaphragm prevents or limits the transfer of fluid from one side to the other to help prevent the loss in precharge pressure in the accumulator. Second, the diaphragm prevents the possibility of chemical or physical breakdown of the fluids in the accumulator which might occur if any transfer of fluid from one side of the diaphragm to the other occurred. Third, the diaphragm prevents the possibility of physical breakdown of the hydraulic system in which the accumulator is used should it not be impervious to the fluids on either side of it.

Although the materials used in the construction of the diaphragm are butyl and Buna "N" rubber or Goodyear Hycar it is fully realized that other materials could be substituted therein to obtain the same result although it is felt that the proposed materials will constitute the most efficient combination at present.

I claim:

1. In a fluid energy storage accumulator unit, a container, a diaphragm in said container comprising a flexible inner bag with one open end for receiving pressure fluid to be stored, an outer bag surrounding said inner bag mainly in spaced relation but having its one end bonded to said inner bag.

2. In a fluid energy storage accumulator unit, a container, a diaphragm in said container comprising a flexible inner bag with one open end for receiving pressure fluid to be stored, an outer bag surrounding said inner bag mainly in spaced relation but having its one end bonded to said inner bag and a fluid of high heat conductivity and lubricating characteristics interposed in the space between said two bags.

3. In a fluid energy storage accumulator unit, a container, a diaphragm in said container comprising a flexible inner bag with one open end for receiving pressure fluid to be stored, an outer bag surrounding said inner bag, the open end of said inner bag and the adjacent end of said outer bag being bonded to said container and otherwise unbonded thereto.

4. In a fluid energy storage accumulator unit, a container, a diaphragm in said container comprising a flexible inner bag with one open end for receiving pressure fluid to be stored, an outer bag surrounding said inner bag mainly in spaced relation but having its one end bonded to said inner bag and a fluid of high heat conductivity and lubricating characteristics interposed in the space between said two bags, the open end of said inner bag and the adjacent end of said outer bag being bonded to said container and otherwise unbonded thereto.

ROBERT J. BREIT.

REFERENCES CITED

The following references are of record in the file of this patent:

UNITED STATES PATENTS

| Number | Name | Date |
| --- | --- | --- |
| 315,453 | Waddell | Apr. 7, 1885 |
| 1,910,322 | Coffin | May 23, 1933 |
| 2,271,124 | Juve | Jan. 27, 1942 |
| 2,283,439 | Herman | May 19, 1942 |
| 2,290,337 | Knauth | July 21, 1942 |
| 2,342,355 | Mercier | Feb. 22, 1944 |
| 2,411,878 | Herrshberger | Dec. 3, 1946 |
| 2,442,083 | Hall | May 25, 1948 |
| 2,465,908 | Mercier | Mar. 29, 1949 |
| 2,467,322 | Lightbrown | Apr. 12, 1949 |